US008920262B2

(12) United States Patent
Kabeshita et al.

(10) Patent No.: US 8,920,262 B2
(45) Date of Patent: Dec. 30, 2014

(54) GOLF BALL WITH AGGREGATED LAYER CORE AND METHOD OF MAKING

(75) Inventors: Yutaka Kabeshita, Portland, OR (US); Kerby LaVar Maxwell, Portland, OR (US); Arthur Molinari, Portland, OR (US); Bradley C. Tutmark, Aloha, OR (US); Takahisa Ono, Fujisawa (JP); Seisuke Tomita, Tokyo (JP)

(73) Assignee: NIKE, Inc., Beaverton, OR (US)

( * ) Notice: Subject to any disclaimer, the term of this patent is extended or adjusted under 35 U.S.C. 154(b) by 166 days.

(21) Appl. No.: 13/475,358

(22) Filed: May 18, 2012

(65) Prior Publication Data

US 2013/0310197 A1 Nov. 21, 2013

(51) Int. Cl.
| | |
|---|---|
| *A63B 37/06* | (2006.01) |
| *A63B 45/00* | (2006.01) |
| *A63B 37/00* | (2006.01) |
| *B29C 45/00* | (2006.01) |
| *B29L 31/54* | (2006.01) |

(52) U.S. Cl.
CPC ............... *A63B 37/004* (2013.01); *A63B 45/00* (2013.01); *A63B 37/0076* (2013.01); *A63B 37/0045* (2013.01); *B29L 2031/546* (2013.01); *B29C 45/006* (2013.01)
USPC .......................................................... 473/376

(58) Field of Classification Search
USPC .......................................... 473/376, 373, 374
See application file for complete search history.

(56) References Cited

U.S. PATENT DOCUMENTS

| | | | |
|---|---|---|---|
| 5,553,852 A * | 9/1996 | Higuchi et al. ............... 473/373 |
| 6,010,411 A | 1/2000 | Reyes | |
| 6,056,842 A | 5/2000 | Dalton et al. | |
| 6,068,561 A | 5/2000 | Renard et al. | |
| 6,290,797 B1 | 9/2001 | Gisetti et al. | |
| 6,494,795 B2 | 12/2002 | Sullivan | |
| 6,527,652 B1 | 3/2003 | Maruko et al. | |
| 6,607,435 B2 | 8/2003 | Yokoyama et al. | |
| 6,607,453 B1 | 8/2003 | Bissonnette et al. | |
| 6,719,653 B1 | 4/2004 | Nesbitt | |
| 7,153,926 B2 | 12/2006 | Isogawa et al. | |

(Continued)

FOREIGN PATENT DOCUMENTS

WO          9903542          1/1999

OTHER PUBLICATIONS

PCT Search Report dated Sep. 25, 2013 for corresponding international application PCT/US2013/041265 filed May 16, 2013.

*Primary Examiner* — Raeann Gorden
(74) *Attorney, Agent, or Firm* — Honigman Miller Schwartz and Cohn, LLP; Anna M. Budde; Jonathan P. O'Brien

(57) ABSTRACT

A golf ball is provided capable of having various characteristics based on having an aggregated layer core. The golf ball includes an inner core, an outer shell enclosing the inner core, and an intermediate core enclosing the inner core. The intermediate core includes sublayers thermoplastically fused together to form an aggregated intermediate core layer having overall characteristics formed as a combination of the sublayer characteristics. A method of forming a golf ball core having an aggregated layer core can include forming a first and second stack of nested cups, thermoplastically bonding each of the stacks to each other to form first and second aggregated cups, arranging the aggregated cups around a golf ball inner core, and bonding the aggregated cups to each other. In some configurations, the sublayers can include ultrathin sublayers less than 20 microns thick, and in some configurations, the sublayers can include injection molded sublayers.

5 Claims, 12 Drawing Sheets

(56) References Cited

U.S. PATENT DOCUMENTS

| | | |
|---|---|---|
| 7,625,302 B2 | 12/2009 | Watanabe et al. |
| 7,935,759 B2 | 5/2011 | Sullivan et al. |
| 8,137,211 B2 | 3/2012 | Dalton et al. |
| 2002/0187855 A1 | 12/2002 | Park et al. |
| 2009/0111608 A1 | 4/2009 | Watanabe et al. |
| 2010/0167844 A1* | 7/2010 | Sullivan et al. ............... 473/376 |

* cited by examiner

GOLF BALL WITH AGGREGATED LAYER CORE AND METHOD OF MAKING

BACKGROUND

The present invention relates generally to a golf ball having an aggregated layer core and to a system and method for making the same. In addition, the present disclosure relates to a system and method for aggregating core layers for a golf ball.

The game of golf is an increasingly popular sport at both amateur and professional levels. A wide range of technologies related to the manufacture and design of golf balls are known in the art. Such technologies have resulted in golf balls with a variety of play characteristics and durability. Some of these technologies have included several core layers within a golf ball having differing properties and characteristics, such as two, three or even four core layers that each has different properties and characteristics. Multiple core layers having differing properties and characteristics in various combinations can provide golf balls having varying characteristics that are appropriate for differing conditions, skill levels, environments and user preferences.

Accordingly, it would be advantageous to make a golf ball having significant variability in the amount of core layers and characteristics of the layers, which can impart a wide variety of options for fine tuning the characteristics of the golf ball.

SUMMARY

A golf ball capable of having various characteristics based on having an aggregated layer core includes an inner core, an outer shell enclosing the inner core, and an intermediate core disposed between the inner core and the outer shell and substantially enclosing the inner core. The intermediate core includes a plurality of sublayers thermoplastically fused together without adhesive materials to form an aggregated intermediate core layer, which has overall characteristics that are formed as an aggregated combination of the characteristics of the plurality of sublayers.

In one configuration, a first set of the plurality of sublayers has first characteristics, a second set of the plurality of sublayers has second characteristics, and the aggregated intermediate core layer has third characteristics different from the first and second characteristics and formed as a combination of the first and second characteristics. In many configurations, the plurality of sublayers includes ultrathin layers having a thickness less than 20 microns. In some configurations, the plurality of sublayers includes ultrathin layers having a thickness less than 2.0 microns. In some configurations, the plurality of sublayers includes ultrathin layers having a thickness less than 0.2 microns (200 nanometers).

A method of forming a golf ball core having an aggregated layer core can include forming a first stack of ultrathin nested cups that each have a thickness less than 20 microns, thermoplastically bonding the first stack of ultrathin nested cups to each other without using an adhesive to form a first aggregated cup, forming a second stack of ultrathin nested cups that each have a thickness less than 20 microns, thermoplastically bonding the second stack of ultrathin nested cups to each other without using an adhesive to form a second aggregated cup, arranging the first and second aggregated cups around a golf ball inner core, and bonding the first and second aggregated cups to each other around the golf ball inner core to form a golf ball core having an aggregated layer.

In one configuration, forming the first and second stacks of ultrathin nested cups can each include providing a mold core with a projection having a size and shape substantially matching the golf ball inner core, depositing first thermoplastic material on the mold core over the projection to form a first ultrathin cup having a thickness less than 20 microns, depositing second thermoplastic material on the first ultrathin cup to form a second ultrathin cup having a thickness less than 20 microns such that the second ultrathin cup covers the first ultrathin cup in a nested arrangement, depositing third thermoplastic material on the second ultrathin cup to form a third ultrathin cup having a thickness less than 20 microns that covers the first ultrathin cup in a nested arrangement, and depositing fourth thermoplastic material on the third ultrathin cup to form a fourth ultrathin cup having a thickness less than 20 microns that covers the first ultrathin cup in a nested arrangement. In many configurations, depositing the first, second, third and fourth thermoplastic materials can include spray-molding or spin-molding the first, second, third and fourth thermoplastic materials.

A method of forming a golf ball core having an aggregated core layer can also include forming a first and a second aggregated stack of intermediate core cups, arranging the first and second aggregated stack of intermediate core cups around a golf ball inner core, and bonding the first and second aggregated cups to each other around the golf ball inner core to form the golf ball core having an aggregated core layer. Forming each of the first and second aggregated stacks of intermediate core cups can include molding a first elastomeric cup having first characteristics, molding a second elastomeric cup having second characteristics, stacking the second elastomeric cup over the first elastomeric cup to form a nested stack, and thermoplastically bonding the first elastomeric cup to the second elastomeric cup.

In some configurations, molding the first elastomeric cup having first characteristics includes molding the first elastomeric cup according to a first mold flow path, and molding the second elastomeric cup having second characteristics includes molding the second elastomeric cup according to a second mold flow path that is different than the first mold flow path. In one configuration, the first elastomeric cup is molded with a first elastomer impregnated with a first directional additive, the second elastomeric cup is molded with a second elastomer impregnated with a second directional additive, and the first and second directional additives impart characteristics according to their orientation when molded.

Other articles, systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Generally, the present disclosure relates to a golf ball having an aggregated layer core and to a system and method for making the same. A golf ball having an aggregated layer core can permit a wide variety of characteristics and configuration options for the golf ball. These options can permit significant flexibility for fine-tuning preferences, features, design configurations and other characteristics of the golf ball according to desired performance and usage parameters.

The golf ball may be made by any suitable process. The process of making the golf ball may be selected based on a variety of factors. For example, the process of making the golf ball may be selected based on the type of materials used and/or the number of layers included. Exemplary processes are discussed below with respect to various features, such as the layers of the exemplary embodiment.

Figure 1:
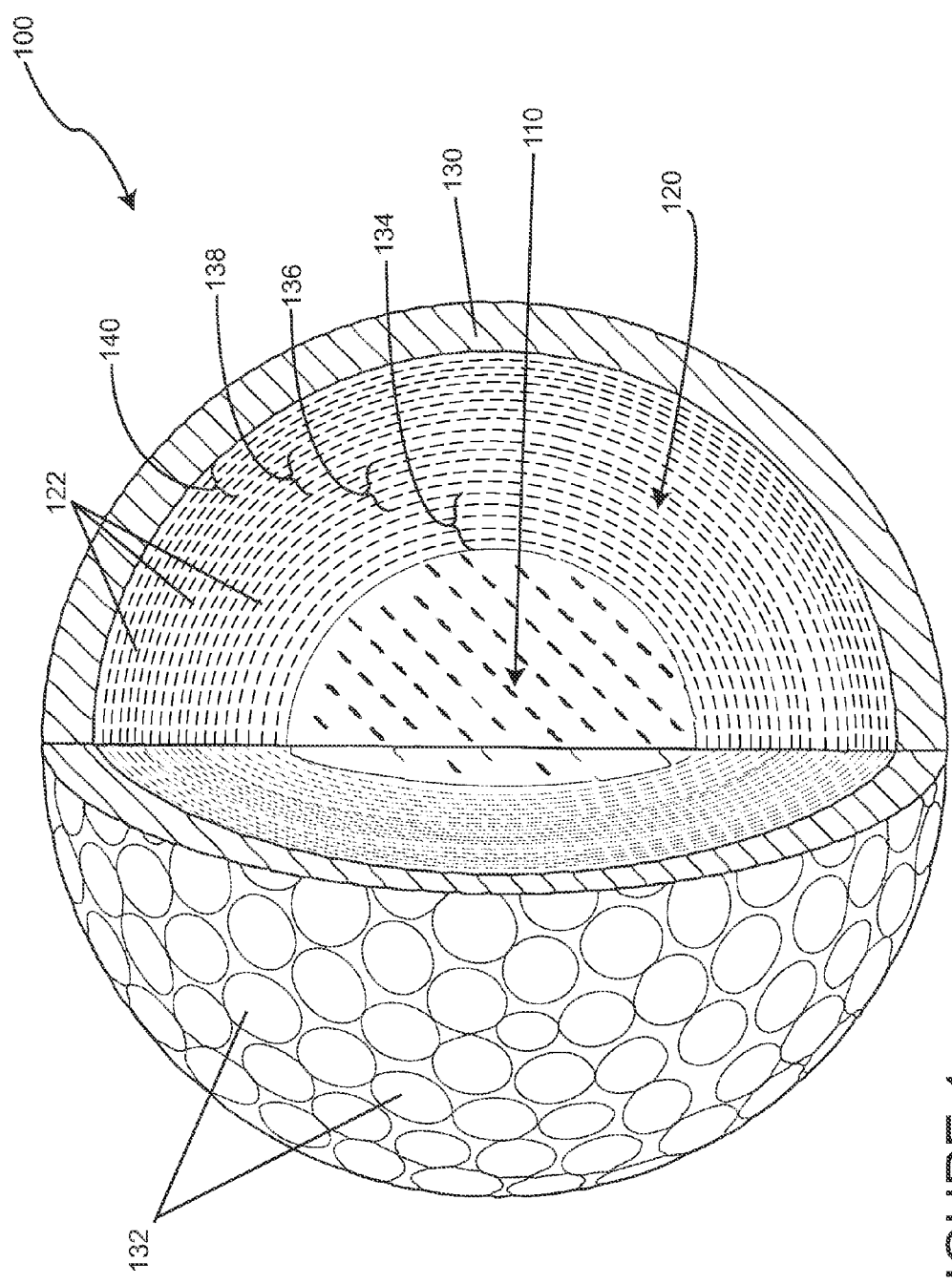
FIG. 1 is a perspective view of an example configuration of a golf ball having an aggregated layer core, which has a cut-out section removed to expose various internal layers of the ball.

Referring first to FIG. 1, an example golf ball 100 is shown that generally includes an inner core layer 110, an intermediate core layer 120, and an outer cover layer 130. Inner core layer 110 is generally made from any material known in the art, and in come embodiments, may include a thermoset material like polybutadiene rubber or a thermoplastic material, such as various urethane and ionomer compositions. In some embodiments inner core layer 110 is made from a highly neutralized polymer. Inner core layer 110 can be made from a blend of highly neutralized polymer compositions, sometimes called highly neutralized acid polymers or highly neutralized acid polymer compositions, and fillers. Inner core layer 110 can generally include two highly neutralized polymer compositions with additives, fillers, and melt flow modifiers. For example, inner core layer 110 can generally include HPF resins such as HPF2000 and HPF AD1035, produced by E. I. DuPont de Nemours and Company.

Inner core layer 110 can be made by any suitable process, such as by a molding process, such as injection or compression molding. During an injection molding process, the temperature of the injection machine can be set, for example, within a range of about 190° C. to about 220° C. In some embodiments, before the injection molding process, at least two materials, such as two highly neutralized polymer compositions, that can form the inner core can be kept sealed in a moisture-resistant dryer capable of producing dry air. Drying conditions for the highly neutralized polymer composition can include 2 to 24 hours at a temperature below 50° C.

Suitable additives and fillers may include, for example, blowing and foaming agents, optical brighteners, coloring agents, fluorescent agents, whitening agents, UV absorbers, light stabilizers, defoaming agents, processing aids, mica, talc, nanofillers, antioxidants, stabilizers, softening agents, fragrance components, plasticizers, impact modifiers, acid copolymer wax, surfactants. Suitable fillers may also include inorganic fillers, such as zinc oxide, titanium dioxide, tin oxide, calcium oxide, magnesium oxide, barium sulfate, zinc sulfate, calcium carbonate, zinc carbonate, barium carbonate, mica, talc, clay, silica, lead silicate. Suitable fillers may also include high specific gravity metal powder fillers, such as tungsten powder and molybdenum powder. Suitable melt flow modifiers may include, for example, fatty acids and salts thereof, polyamides, polyesters, polyacrylates, polyurethanes, polyethers, polyureas, polyhydric alcohols, and combinations thereof.

Outer cover layer 130 generally covers outer core layer 120, which generally surrounds and encloses inner core layer 110. Outer cover layer 130 may, for the purposes of this disclosure, be considered an outer shell which encloses the interior layer. Other layers may also be considered to be outer shells which enclose any layers enclosed within the outer shell layer. Such layers may include intermediate layers between the center core layer and outer cover layer 130.

Outer cover layer 130 may be made from any material known in the golf ball art, including but not limited to ionomers such as Surlyn®, urethanes, thermoplastic polyurethanes, balata, and combinations of these materials. In some embodiments, the outer cover layer material is a blend of PTMEG, BG, TMPME, DCP, and MDI in varying percentages by weight. "PTMEG" is polytetramethylene ether glycol, having a number average molecular weight of 2,000, and is commercially available from Invista, under the trade name of Terathane® 2000. "BG" is 1,4-butanediol, commercially available from BASF and other suppliers. "TMPME" is trimethylolpropane monoallylether, commercially available from Perstorp Specialty Chemicals AB. "DCP" is dicumyl peroxide, commercially available from LaPorte Chemicals Ltd. "MDI" is diphenylmethane diisocyanate, commercially available from Huntsman, under the trade name of Suprasec® 1100. Specifically, these materials may be prepared by mixing the components in a high agitated stir for one minute, starting at a temperature of about 70° C., followed by a 10-hour post curing process at a temperature of about 100° C. The post cured polyurethane elastomers may be ground into small chips.

Other suitable outer cover layer compositions are disclosed in the following parent documents, each of which is incorporated herein in its entirety:

US Patent Publication Number 20120004050, currently U.S. patent application Ser. No. 12/829,131 to Yasushi Ichikawa et al., filed on Jul. 1, 2010 under the title "Golf Ball Incorporating Thermoplastic Polyurethane";

US Patent Publication Number 20130172104, currently U.S. patent application Ser. No. 13/341,544 to Thomas J. Kennedy III, filed on Dec. 30, 2011 under the title "Ionomer/Polyamide Alloy for Golf Balls"; and US Patent Publication Number 20130172122, currently U.S. patent application Ser. No. 13/342,551 to Yasushi Ichikawa et al., filed on Jan. 3, 2012 under the title "Over-Indexed Thermoplastic Polyurethane Elastomer, Method of Making, and Articles Comprising The Elastomer".

Outer cover layer 130 may be manufactured using any known technique, including but not limited to injection molding, RIM, and compression molding. The thickness of outer cover layer 130 may be any desired thickness. In some embodiments, the thickness of the outer cover layer is selected to allow the golf ball to be a conforming golf ball. In some embodiments, the thickness of outer cover layer 130 is selected to enhance the feel of the golf ball. In some embodiments, the thickness of the outer cover layer is between about 0.5 mm to about 1.5 mm. In some embodiments, the thickness of outer cover layer 130 is about 1.1 mm.

Golf balls according to this disclosure are provided with dimples on the outer cover layer to enhance the aerodynamic performance of the golf ball. Any number of dimples having any shape and depth and in any pattern known in the art may be provided on outer cover layer. In some embodiments, between 200 and 500 hemispherical dimples may be provided. In some embodiments, between 300 and 400 dimples may be provided. In some embodiments, between 320 and 350 dimples may be provided.

In some embodiments, one or more coating layers may be applied to outer cover layer 130. The coating layer(s) may be provided for any reason, such as for altering a hardness of the outer cover layer, altering the aerodynamics of the golf ball, enhancing the visibility of the golf ball, and for aesthetic purposes. The coating may be any type of coating known in the art, including but not limited to paints, inks, clear coats, urethane coatings, sparkle coatings, and the like. The coating may be applied using any method known in the art, including but not limited to spraying, stamping, pad printing, brush applications, combinations of these techniques, and the like.

Intermediate core layer 120 includes a plurality of sublayers 122 that have been fused together to form intermediate core layer 120 collectively as an aggregation of the sublayers. That is, intermediate core layer 120 in the configuration shown in FIG. 1 is a single core layer that has been formed as an aggregation of the multiple subcomponent sublayers 122, which have in turn have been fused to one another to form the overall intermediate core layer 120.

In many configurations, sublayers 122 can be thermoplastically fused directly to one another without the use of any bonding agents (such as adhesives) that can help bind the sublayers to one another, but which can also interfere with the integral bonding and cross-linking of sublayer materials that help form the overall aggregated unit for many types of sublayer materials and combinations. Further, it can be desirable to use processing agents in many configurations, such as melt flow agents that can assist with the flow of thermoplastic materials for forming sublayers 122 during a bonding process.

Although avoiding the use of bonding agents or any other intermediate materials between sublayers 122 can more easily permit the sublayers to form material bonds directly with adjacent sublayers in many configurations, there may be configurations in which it can be beneficial. For example, in some configurations, the use of bonding agents can be beneficial for enabling bonds between disparate layers that may not otherwise bond well or for encouraging cross-bonding between materials. Thus, although avoiding the use of bonding agents can be beneficial in many configurations discussed herein, the reverse may be the case for many other configurations.

Further, although using processing agents can encourage the formation of bonds between layers, there can be other configurations in which bonding agents can be beneficial and can be used. For example, in some configurations processing agents can be of little benefit, such as configurations including common elastomers that can readily bond to each other without the use of a processing agent. Thus, although the use of processing agents can generally be beneficial in many configurations discussed herein, the reverse may be the case for other configurations in which processing agents may be of little or no benefit.

Overall, however, the use of multiple sublayers 122 to collectively form intermediate core layer 120 can generally be performed without the use of bonding agents between sublayers and with the use of processing agents as appropriate. Whether with or without the use various agents during processing, the use of multiple sublayers 122 to collectively form intermediate core layer 120 as a single, integrated, aggregated unit can provide many advantages.

For example, characteristics of the sublayers 122 can differ throughout the group of sublayers that form intermediate core layer 120 in a wide variety of configurations, which can provide almost limitless configurations of intermediate core layers 120 having differing characteristics based simply on the sublayer configurations. These can include differing characteristics of the individual sublayers, their arrangement within the stack that forms the intermediate core layer, the combinations of the sublayers in the aggregate, etc. As such, many characteristics of golf ball 100 can be fine-tuned as desired with a wide variety of options based on the configuration of sublayers 122 forming intermediate core layer 120 in its aggregated configuration.

In a relatively simple example shown in FIG. 1, a first subset of sublayers 134 (e.g., a first group of sublayers, such as the first five sublayers proximate inner core 110) could have a first set of characteristics. The characteristics could include particular material properties, such as a thermoplastic material having a relatively high flex modulus. A second subset of sublayers 136 (e.g., a second group of sublayers, such as the second five sublayers extending from inner core 110 toward outer cover layer 130) could have a second set of characteristics, such as having a higher flex modulus than first subset 134. Similarly, a third subset of sublayers 138 could include the next five sublayers extending outward from inner core 110 and could have an increasingly higher flex modulus than second subset 136. Likewise, a fourth subset of sublayers 140 could include the last five sublayers shown in example golf ball 100 that are proximate outer cover layer 130, which could have the highest flex modulus of the subsets.

As such, intermediate cover layer 120 shown in FIG. 1, which has been formed as an aggregated unit from the stack of sublayers 122 nested inside each other and thermoplastically bonded to each other to form an integral single unit, can have overall characteristics formed as an aggregate of the sublayers. In the present example, intermediate core layer 120 would have the characteristic of an increasing flex modulus extending radially from the inside of intermediate core layer 120 proximate inner core 110 to its exterior region proximate outer cover shell 130.

Many different characteristics of sublayers 122 can be varied as desired to provide highly customized overall properties for intermediate core layer 120 in the aggregate—both as collective properties and as varying properties that change in a predetermined manner throughout the intermediate core layer 120. For instance, intermediate core layer 120 may have an overall "average" flex modulus that is based on a weighted average of the sublayers' flex moduli, as well as predetermined varying pattern of changing flex modulus at specific points extending from the interior to the exterior of the intermediate core layer.

Of course, there are many different characteristics of sublayers 122 that could varied as desired to provide highly customized overall properties for intermediate core layer 120 in the aggregate. Some examples are discussed herein by way of the example configurations shown and described. However, numerous different configurations are possible. Characteristics that can be varied based on differing characteristics of sublayers 122 can, for example, include the following: material type (e.g., variations of the same elastomer between sublayers and/or combinations of different elastomers); material properties (e.g., hardness, flexibility, impact resistance, yield strength, compressibility); additives (e.g., added elastomers, impregnated materials, suspended particles, fibers, fillings, etc.); orientation (e.g., flow direction); subparticle size and composition; sublayer thicknesses; etc.

Further, complex arrangements could be implemented that can provide desirable aggregate characteristics to the intermediate core layer 130. For example, multiple types of sublayers could be arranged in a predetermined nested stack arrangement to form an overall intermediate core layer 130 having complex variations of characteristics. As a simple example that can also be described using FIG. 1, suppose that sublayers 122 include four different sublayer types having different characteristics (e.g., sublayer types 1, 2, 3 and 4), which were sequentially stacked throughout intermediate core layer 120 according to the arrangement 1, 2, 3, 4-1, 2, 3, 4-1, 2, 3, 4 repeatedly until a desired stack thickness were reached for forming intermediate core layer 120. Suppose that sublayer type 1 provided desirable strength characteristics, such as via a fiber filled polymer; sublayer type 2 provided desirable impact-absorption characteristics; sublayer type 3 included a weighted polymer such as a polymer having weighted additives embedded in it that imparted desirable spin characteristics during use; and sublayer type 4 provided desirable compression resistance.

The alternating arrangement of these sublayers could provide beneficial characteristics to golf ball 100 via the complex set of characteristics they impart to intermediate layer 120 in the aggregate when bonded to one another in their alternating arrangement, which could not otherwise be easily provided. Of course the order and arrangement of the sublayers could be varied in many other ways beyond the simple example provided and could provide various types of sublayers in various combinations.

Figure 2:
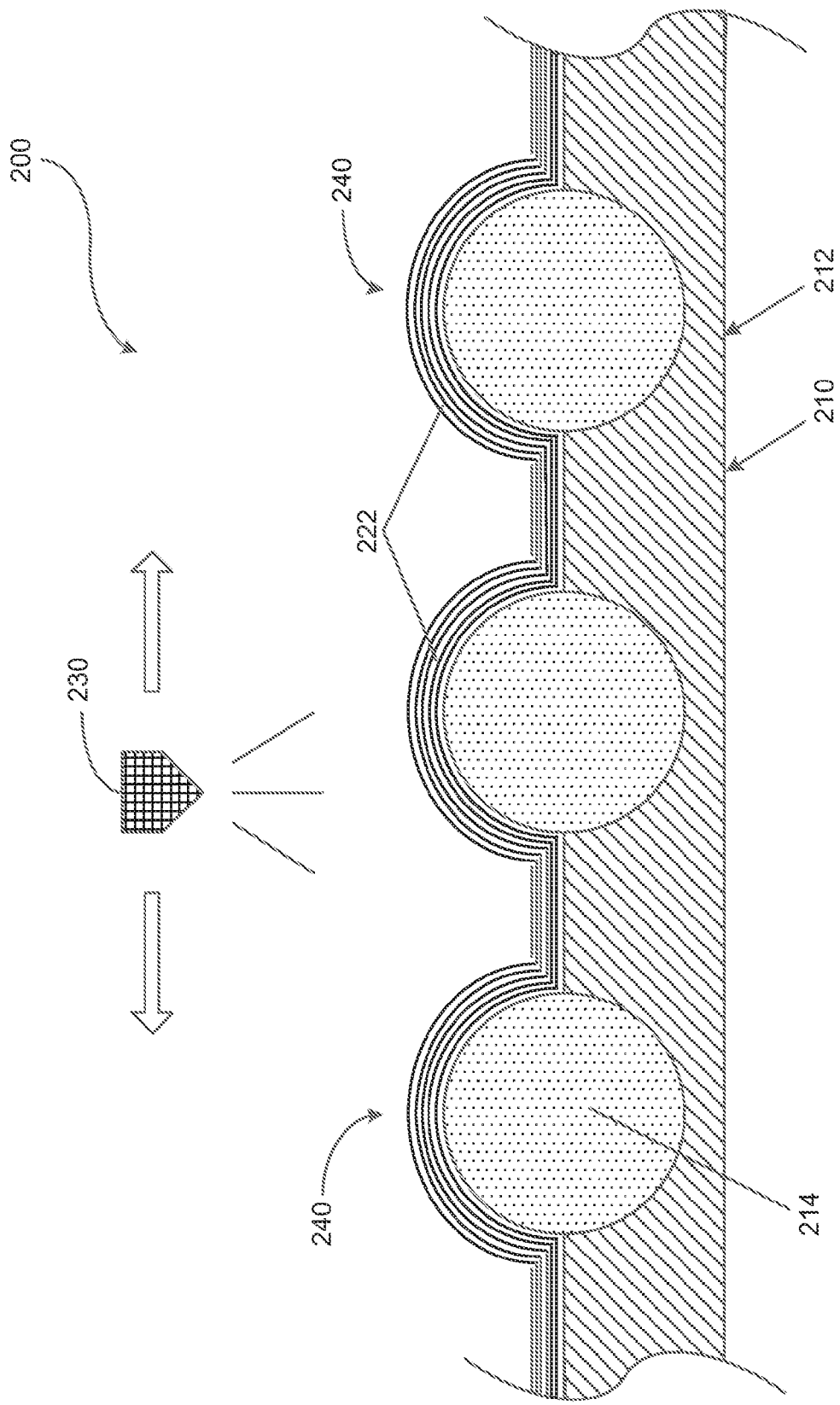
FIG. 2 illustrates an example process of depositing thermoplastic material to form ultrathin nested cups for an aggregated layer core.
Figure 3:
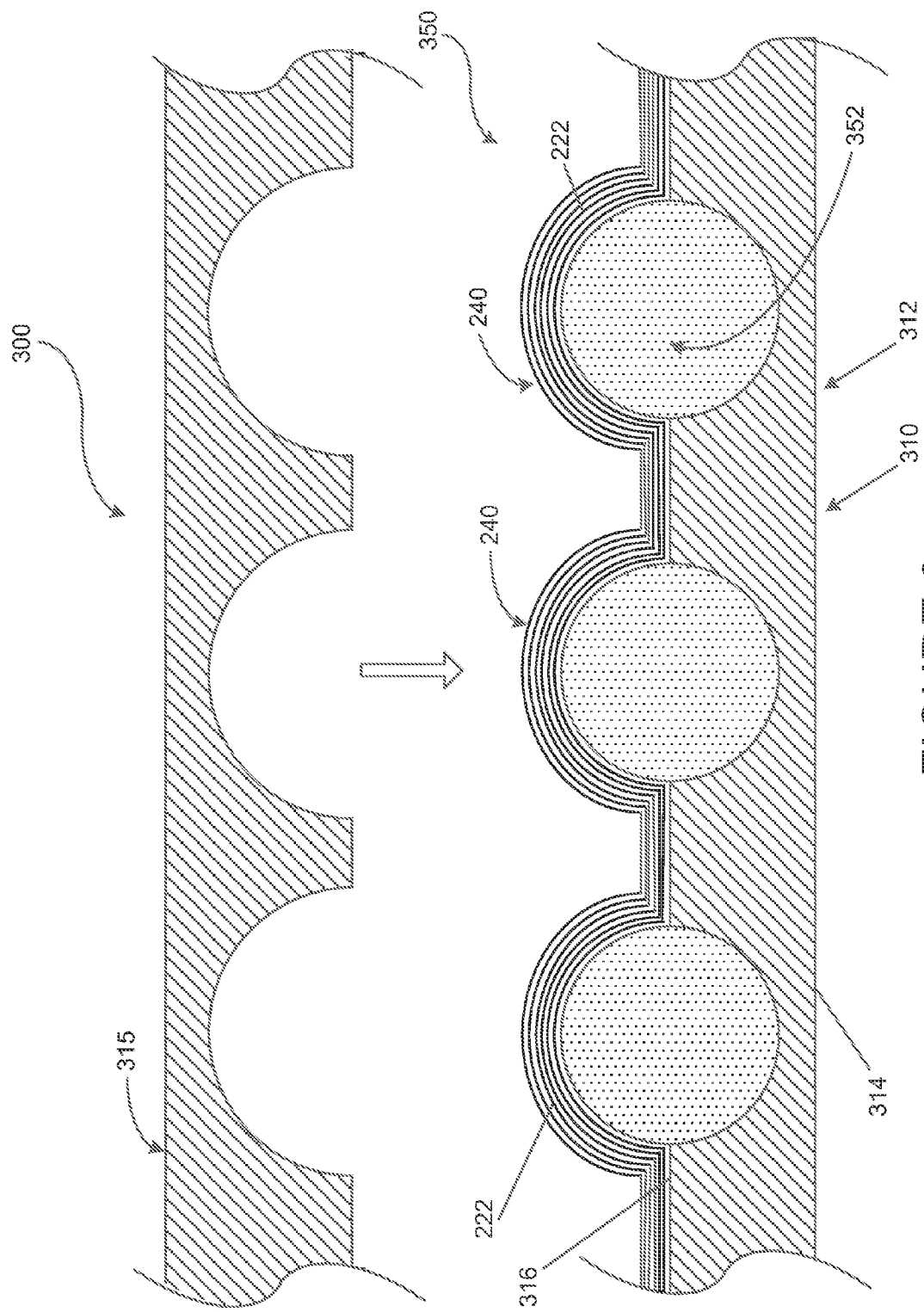
FIG. 3 illustrates an example process of aggregating ultrathin nested cups to form an aggregated cup.
Figure 4:
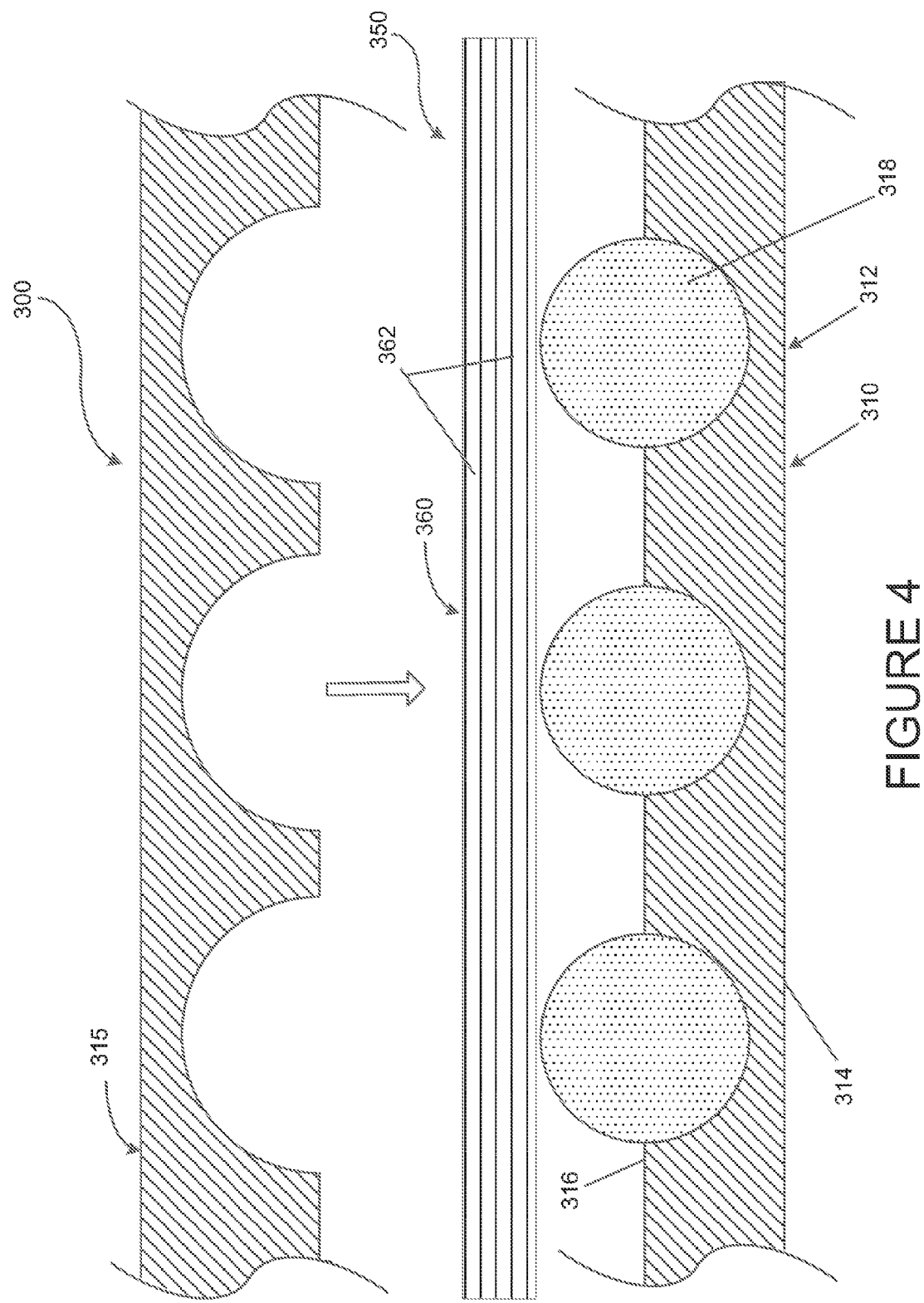
FIG. 4 illustrates an example process of aggregating ultrathin thermoplastic layers to form an aggregated cup.

Referring now to FIG. 2, an example system 200 is shown for forming ultrathin nested cups 222 in an arrangement to form intermediate core layer 120 of FIG. 1 according to many configurations. Ultrathin nested cups 222 are formed from a plurality of ultrathin layers arranged in a stacked and nested arrangement and configured to form a portion of intermediate core layer 120. For example, the arrangements shown in FIGS. 2, 3 and 4 illustrate processes for forming nested cups that each cover half (a hemisphere) of inner core 110 and are ultimately aggregated to form a hemispherical half of intermediate core layer 120 (FIG. 1). A pair of hemispherical halves can thereafter be joined to one another when disposed around inner core 110. As will be apparent to those of skill in the art, a substantially hemispherical cup would be made with some additional length to allow for trimming and joining of halves together.

Figure 5:
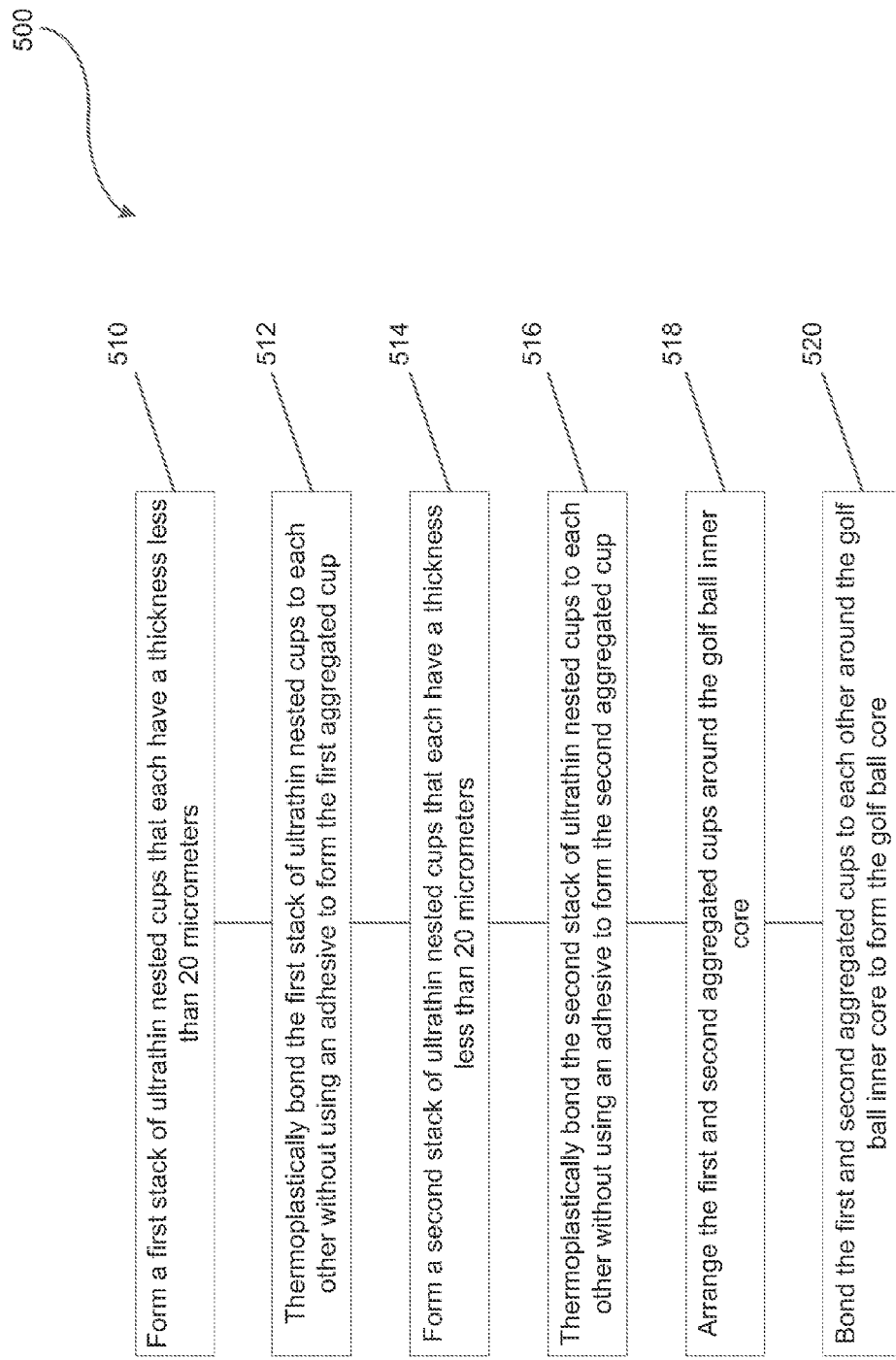
FIG. 5 shows steps of an example process for forming a golf ball core having an aggregated core layer formed from a plurality of ultrathin nested cups.

FIG. 2, as well as FIGS. 3-5, describe example configurations of sublayers 122 (FIG. 1) formed as "ultrathin" layers or "ultrathin" cups. In these configurations, sublayers 122 are formed to have a thickness of about 20 microns or less and even as thin as 0.2 microns (200 nanometers) or less, such as 100 nanometers. Layers or sheets of elastomeric material within this range of thicknesses (about 20 microns to about 0.1 microns) are extremely thin and are referred to herein as "ultrathin."

The use of ultrathin sublayers for sublayers 122 (FIG. 1) can provide many advantages. For example, the use of such thin layers can permit great flexibility in the arrangement of sublayers that form intermediate core layer 120, such as permitting tens and even hundreds of sublayers to be aggregated. The use of many layers can allow for complex arrangements of various types of sublayers, which can allow for significant freedom to fine tune desired aggregated characteristics for intermediate core layer 120 and golf ball 100 overall.

Referring back to FIG. 2, example system 200 for forming ultrathin layers generally includes a mold base 210 having a platform 212 and a plurality of inner core projections 214 extending from an upper surface of the platform. Inner core projections 214 can be generally hemispherical representations of a portion of inner core 110, which can be used to form an appropriately sized and shaped cavity within the ultrathin nested cups 222 for later placing around inner core 110. In some configurations, however, platform 212 can be configured to retain actual inner cores 110 for the golf ball and ultrathin nested cups 222 can be formed on the actual inner core.

System 200 generally includes an elastomeric deposition device 230 configured to deposit elastomeric material over mold base 210 and a previously formed ultrathin layer (if applicable) in order to form one or more stacks 240 of nested ultrathin cups 222. The ultrathin layers can be less than 0.2 microns (200 nanometers) thick in some configurations, such as about 100 nanometers thick, and about to 20 microns (20,000 nanometers) thick or less in other configurations.

In some configurations, deposition device 230 can, for example, include one or more spray nozzles for spraying droplets of elastomeric material, which can be fixed or movable as appropriate to provide an arrangement that can form a generally uniform ultrathin layer from desired elastomeric materials. In other configurations, deposition device 230 can, for example, include one or more spin mold heads for distributing elastomeric droplets in a spin mold arrangement. Other appropriate configurations for deposition device 230, as well as for system 200 in general, can be used that can deposit elastomeric material having desired characteristics in an ultrathin layer, such as from 20 microns to less than 0.2 microns (e.g., about 100 nanometers or less). Once formed, a stack of ultrathin layers can thereafter be aggregated to form intermediate core layer 120 or a portion thereof, which can be performed via an aggregation press.

Referring now to FIG. 3, an example aggregation press 300 is generally shown for aggregating ultrathin nested cups 222 to form an aggregated cup 250. Aggregation press 300 generally includes a core 310 and an opposing cavity 316 that together form a mold press 350. Core 310 generally includes a platform 312 having a base side 314 and an opposite core side 316. Core side 316 has a plurality of inner core projections 318 extending away from platform 312 toward cavity 316. Core projections 318 generally have the shape and size of a portion of inner core 110 shown in FIG. 1, such as a hemispherical side of the inner core.

Core 310 and opposing cavity 316 are configured to move together and surround the stack of ultrathin nested cups 240 when in a closed position. As such, core 310 and cavity 316 generally act as a mold to form intermediate core layer 120 by surrounding ultrathin nested cups 240 and subsequently applying pressure and/or heat to the stack of ultrathin nested cups 240 while retaining it in the desired shape and size for intermediate core layer 120. This places ultrathin nested cups 240 in a configuration to allow the elastomers to flow and bond with one another to form intermediate core layer 120 as an aggregated structure formed from the desired arrangement of ultrathin layers forming ultrathin cups 240.

Referring now to FIG. 4, an aggregation press 400 is generally shown for forming ultrathin nested cups 222 while also aggregating ultrathin nested cups 222 to form an aggregated cup 250 and/or a portion of intermediate core layer 120. Aggregation press 400 generally includes the same features and preferences as aggregation press 300 shown in FIG. 3, except as discussed hereafter.

Aggregation press 400 is configured to shape a stack 360 of ultrathin sheets 362 into a stack of ultrathin cups and, during the same general process, to aggregate the ultrathin cups. In general, aggregation press 400 is configured to use preexisting ultrathin sheets 362 as the source for forming the cups and aggregating them. Such a configuration can be advantageous in that it can permit the use of off-the-shelf ultrathin sheets 362 (e.g., flat ultrathin sheets), which may be less expensive or more readily available than custom formed sheets. Further, such a configuration can permit the use of multi-layered sheets, such as co-extruded elastomeric sheets that are initially formed as a stack of ultrathin sheets via their extrusion process. As such, aggregation press 400 forms ultrathin stack 360 into its desired cup shape as the press closes about the ultrathin stack, and subsequently forms it into an aggregated cup similar to the aggregation process described above for FIG. 3.

Referring now to FIG. 5, a method 500 is generally shown for forming a golf ball core having an aggregated core layer, which can include features and processes described above along with FIGS. 1 to 4. As such, for reference purposes, method 500 will be described using the example golf ball 100 shown in FIG. 1 along with system 200 and aggregation presses 300 and 400 shown in FIGS. 2-4. As shown in FIG. 5, a first step of method 500 includes the step 510 of forming a first stack of ultrathin nested cups that each has a thickness less than 20 microns. For example, the ultrathin nested cups could be formed via a spray molding or spin molding process as described along with FIG. 2 or via ultrathin sheets that are shaped to form the nested cups, as described along with FIG. 4.

Method 500 further includes the step 512 of thermoplastically bonding the first stack of ultrathin nested cups to each other without using an adhesive to form a first aggregated cup, which, for example, could be performed as described along with FIGS. 3 and 4. Method 500 includes steps 514 and 516 that generally repeat steps 510 and 512 for the second stack of ultrathin nested cups that can mate with the first set. In particular, step 514 includes forming a second stack of ultrathin nested cups that each have a thickness less than 20 microns and step 516 includes thermoplastically bonding the second stack of ultrathin nested cups to each other without using an adhesive to form a second aggregated cup.

Method 500 continues with steps for connecting the aggregated cups to each other in a configuration around the inner core. In particular, it includes the step 518 of arranging the first and second aggregated cups around the golf ball inner core and the step 520 of bonding the first and second aggregated cups to each other around the golf ball inner core to form a golf ball core. These steps can be performed in any suitable manner, such as via processes similar to methods employed for joining non-aggregate hemispherical elastomeric cups to each other around a golf ball inner core. For example, the opposing hemispheres of the first and second aggregated cups could be arranged opposite each other and disposed about the inner core. While in such an arrangement, they could be fused to each other via processes like compressing the opposing hemispheres against each other under heat and pressure, or compressing the opposing hemispheres against each other while spinning them against each other to generate sufficient heat and pressure to melt adjacent portions of the hemispheres and encourage them to thermoplastically bond with each other when in a melted state in contact with each other.

Figure 6:
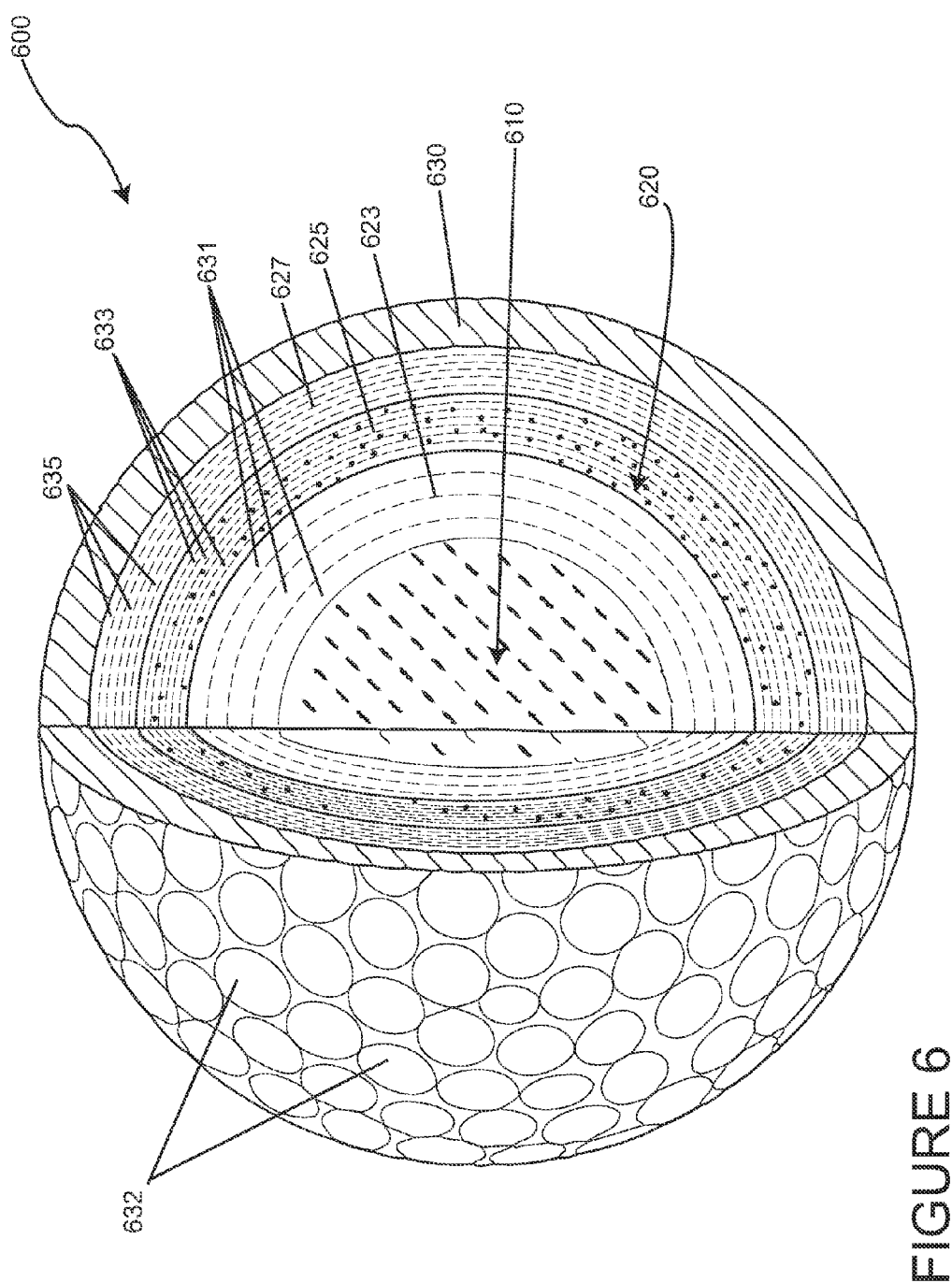
FIG. 6 is a perspective view of another example configuration of a golf ball having an aggregated layer core including multiple aggregated core layers, which also includes a cut-out section removed to expose various internal layers of the ball.

Referring now to FIG. 6, another example configuration of a golf ball 600 is generally shown that has an aggregated layer core including multiple aggregated core layers. Golf ball 600 generally includes the aspects and preferences of golf ball 100, except as discussed hereafter. Golf ball 600 generally includes an inner core 610, an outer cover shell 630, and an intermediate core 620 disposed between the inner core and the outer cover shell. However, intermediate core 620 in this example configuration includes three major sub-sections having different aggregated layer configurations.

Aggregated core subsection 623 is disposed adjacent to inner core 610 and is formed as an aggregation of a plurality of relatively thick sublayers 631. For example, sublayers 631 can be formed from flat sheets of relatively thick and heavy elastomeric material in comparison with other layers of intermediate core 620. Because sublayers 631 are proximate inner core 610, it can be beneficial for them to have characteristics similar to inner core 610, such as being relatively dense and impact resistant in comparison with intermediate core layers disposed further from inner core 610. Further, sublayers 631 can be thicker than the ultrathin sheets described previously, such as more than 20 microns, which can assist with providing a denser configuration close to the inner core. However, sublayers 631 can differ from one another to provide benefits from having an aggregated configuration, such as each layer being increasingly less dense extending radially away from inner core 610.

Moving outward, aggregated core section 625 includes sublayers 633 having weighted particles embedded therein, such as graphite fibers being embedded in sublayers 633. The use of embedded graphite fibers or another weighted material can provide an aggregated intermediate layer 625 having characteristics that affect performance of the golf ball during use, such as affecting its rotation based on moment of inertia characteristics provided by the weighted intermediate core layer. Sublayers 633 can be formed, for example, using spray molding or spin molding techniques described along with FIG. 2, which can include forming sublayers 633 as ultrathin layers or as thicker layers. In addition, sublayers 633 and aggregated intermediate core layer 625 can be formed via methods and apparatus similar to those discussed along with FIG. 3 that make use of flat elastomeric sheets. Sublayers 633 can also differ from each other as desired to impart customized characteristics to aggregated intermediate core subsection 625.

Moving further outward to a region proximate outer cover shell 630, aggregated intermediate core subsection 627 can include relatively lightweight and flexible materials in comparison with subsections 623 and 625, which can provide impact resistance benefits and other characteristics that may be appropriate proximate outer cover shell 630. As such, sublayers 635 forming aggregated intermediate core subsection 627 can include ultrathin sublayers similar to those discussed along with FIGS. 2 and 3.

Figure 7:
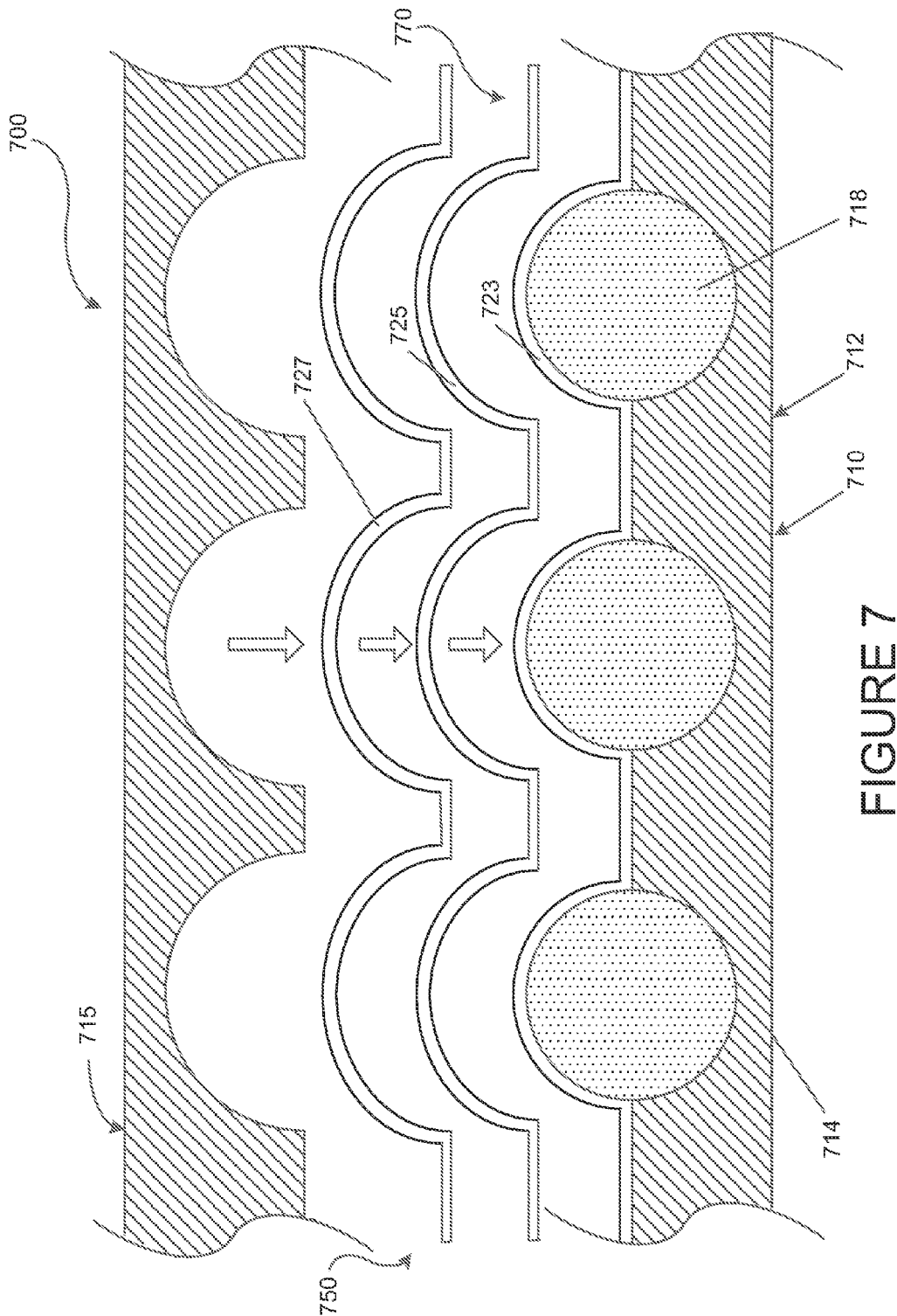
FIG. 7 illustrates an example process of aggregating nested cups to form an aggregated cup.

Aggregated cups can be formed for each of aggregated intermediate core subsections 623, 625 and 627 from their respective sublayers similar to the processes described above along with FIGS. 2-5. Once formed, the aggregated cups can be nested and bonded to one another to form mating overall aggregated cups ultimately to form intermediate aggregated layer 620 as a single aggregated unit. FIG. 7 illustrates an example system for aggregating the separate aggregated cups formed for each of subsections 623, 625 and 627 into an overall aggregated cup for integrated aggregated layer 620.

Referring now to FIG. 7, an aggregation press 700 is generally shown for aggregating nested aggregated cups 723, 725 and 727 into an overall aggregated cup for intermediate aggregated layer 620. Aggregation press 700 generally includes the aspects and preferences of aggregation press 300, except as discussed hereafter. Aggregation press 700 generally includes a core 710 and an opposing cavity 716 that together form a mold press 750. Core 710 generally includes a platform 712 having a base side 714 and an opposite core side 716. Core side 716 has a plurality of inner core projections 718 extending away from platform 712 toward cavity 716. Core projections 718 generally have the shape and size of a portion of inner core 610 shown in FIG. 6, such as a hemispherical side of the inner core.

Core 710 and opposing cavity 716 are configured to move together and to compress and bond aggregated cups 723, 725 and 727 arranged in nested stack 770 to each other when in a closed position. As such, core 710 and cavity 716 generally act as a mold to form intermediate core layer 620 by surrounding nested cups 723, 725 and 727 and subsequently applying pressure and/or heat to nested stack 770 while retaining it in the desired shape and size to form intermediate core layer 620. This places nested stack 770 in a configuration to allow the elastomers of the adjacent cups 723, 725 and 727 to flow and bond with one another to form intermediate core layer 620 as an aggregated structure formed from the desired arrangement of subsections 623, 625 and 627 and corresponding aggregated cups 723, 725 and 727.

Figure 8:
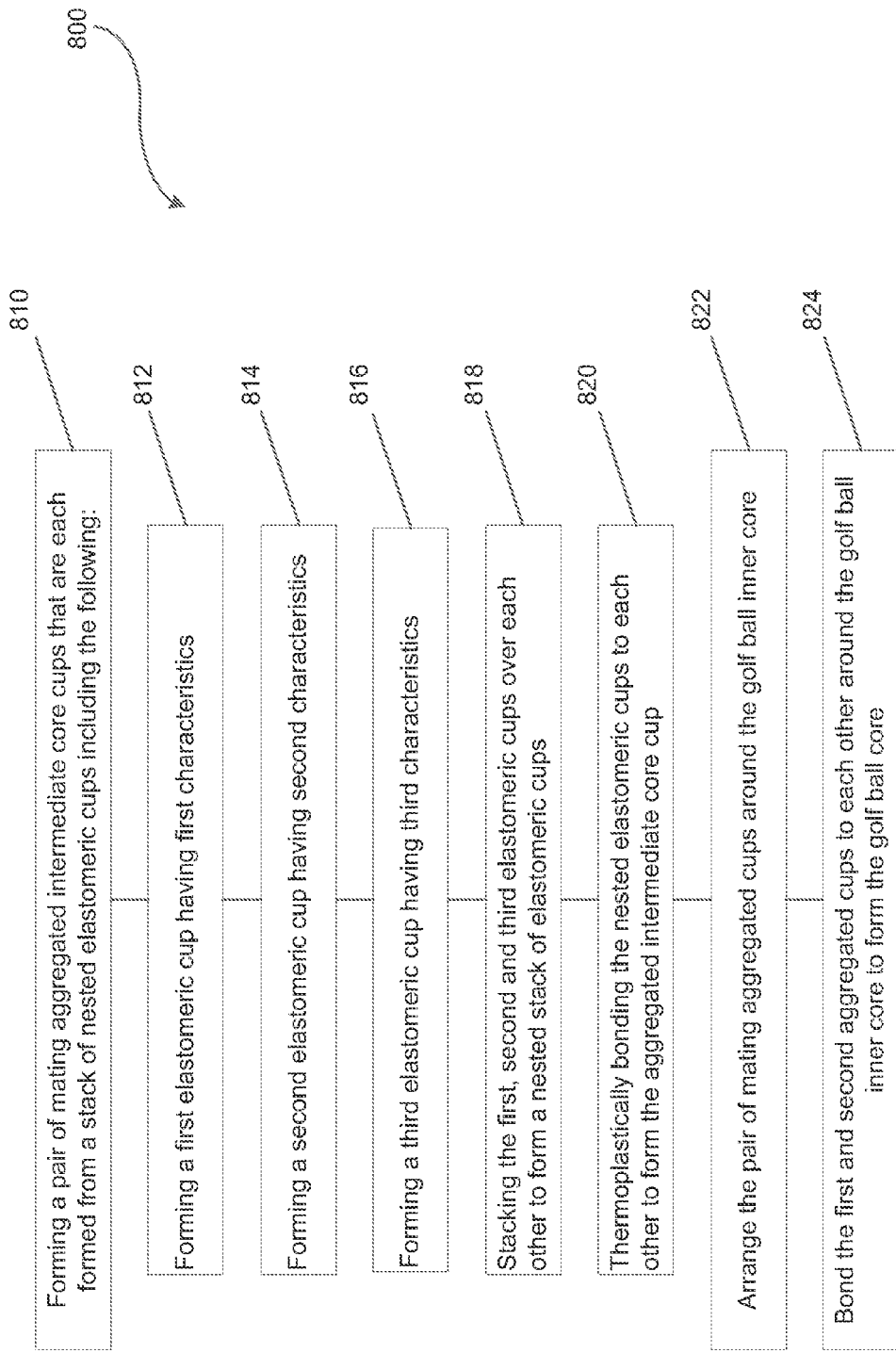
FIG. 8 illustrates an example process for forming a golf ball core having an aggregated core layer formed from a plurality of nested cups.

FIG. 8 illustrates an example method 800 for forming a golf ball core having an aggregated core layer from a plurality of nested cups. As shown, method 800 includes the step 810 of forming a first and a second aggregated stack of intermediate core cups that are each formed from a stack of nested elastomeric cups. Step 810 for forming each of the aggregated stacks (i.e., corresponding cups), includes steps 812 through 820. Step 812 includes forming a first elastomeric cup having first characteristics, such as forming aggregated cup 723. Step 814 includes forming a second elastomeric cup having second characteristics, such as forming aggregated cup 725. Step 816 includes forming a third elastomeric cup having third characteristics, such as forming aggregated cup 727. Step 818 includes stacking first, second and third elastomeric cups over each other to form a nested stack of elastomeric cups, such as stack 770 shown in FIG. 7.

Step 820 includes thermoplastically bonding the nested elastomeric cups to each other to form the overall aggregated intermediate core cup, such as the example described along with FIG. 7. Once the overall aggregated cups have been formed, method 800 includes steps 822 and 824 for combining the mating aggregated cups. In particular, method 800 includes the step 822 of arranging the pair of mating aggregated cups around the golf ball inner core and the step 824 of bonding the first and second aggregated cups to each other around the golf ball inner core to form the golf ball core.

Figure 9:
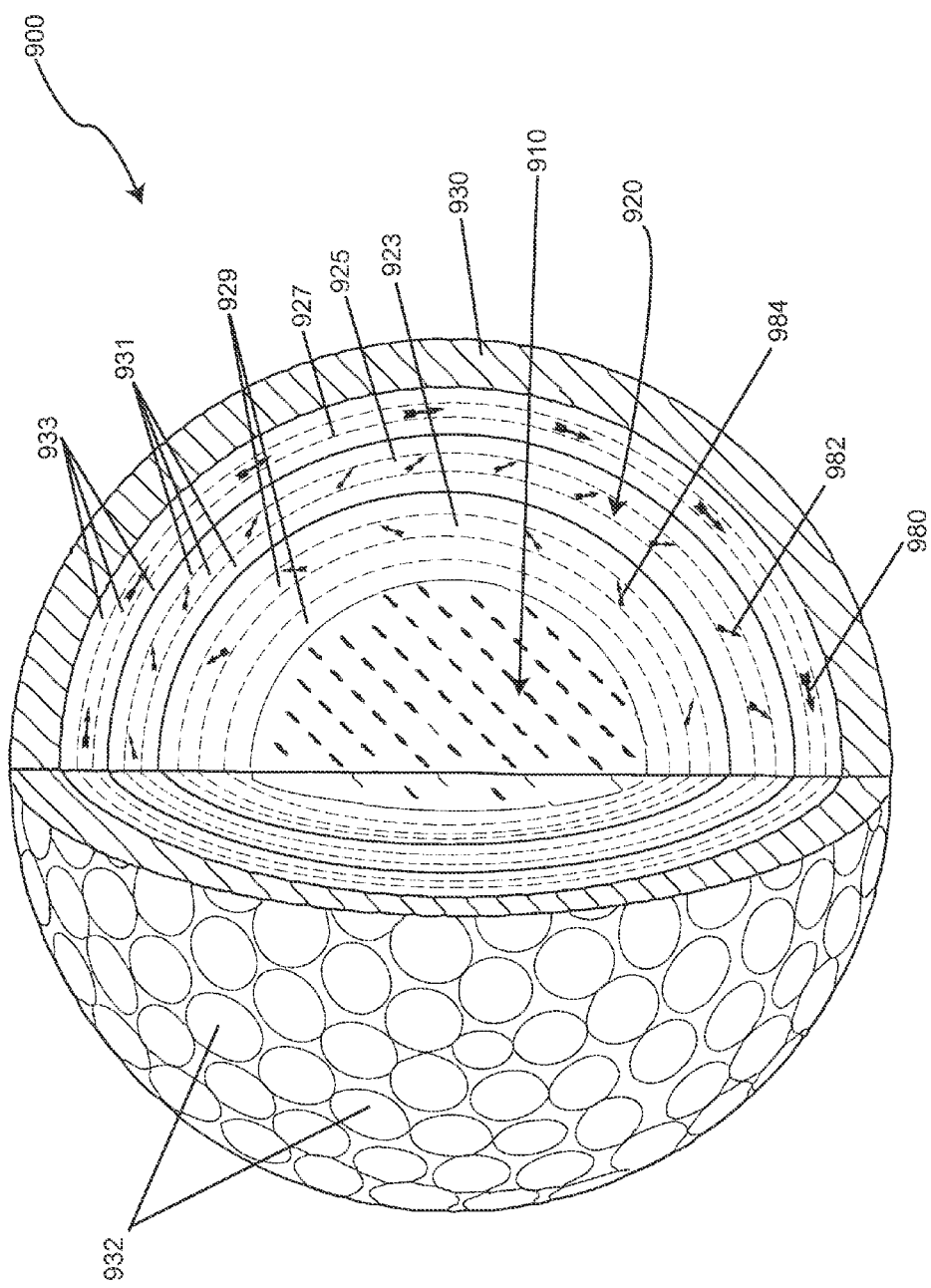
FIG. 9 is a perspective view of yet another example configuration of a golf ball having an aggregated layer core including nested injection molded cups, which also includes a cut-out section removed to expose various internal layers of the ball.

Referring now to FIG. 9, another example configuration of a golf ball 900 is generally shown that has an aggregated layer core including multiple aggregated core layers. Golf ball 900 generally includes the aspects and preferences of golf balls 100 and 600, except as discussed hereafter. Golf ball 900 generally includes an inner core 910, an outer cover shell 930, and an intermediate core 920 disposed between the inner core and the outer cover shell. However, intermediate core 920 in this example configuration includes three major sub-sections formed from aggregated layers of injection molded cups, which have different characteristics based on molding parameters.

Aggregated core subsection 923 is disposed adjacent to inner core 610 and is formed as an aggregation of a plurality of injection molded sublayers 929 having a first molding characteristic, such as a first mold path 984. For example, subsections 929 can be formed as injection molded cups configured to be nested inside of each other. Further, injection molded cups 929 can have a first molding characteristic, such as a first mold path 984 formed by the directional flow of elastomeric material through the mold while forming each of the cups. Subsections 929 can also include other characteristics, such as those discussed previously for other configurations, as well as other molding characteristics, such as a particular mold thickness.

Moving radially outward, aggregated core subsection 925 is disposed adjacent to subsection 923 on its exterior moving radially away from inner core 910 and is formed as an aggregation of a plurality of injection molded sublayers 931 having a second molding characteristic, such as a second mold path 982. For example, subsections 931 can be formed as injection molded cups configured to be nested inside of each other and have second mold path 982 formed by the directional flow of elastomeric material through the mold that is different from mold path 984 for aggregated core subsection 923. Similarly, aggregated core subsection 927 is disposed adjacent to subsection 925 on its exterior moving radially away from inner core 910 and is adjacent to outer cover shell 930. Outer aggregated core subsection 927 is likewise formed as an aggregation of a plurality of injection molded sublayers 933 having a third molding characteristic, such as a third mold path 980. For example, subsections 933 can be formed as injection molded cups configured to be nested inside of each other and have third mold path 980 formed by the directional flow of elastomeric material through the mold, which can be different from mold path 984 for first aggregated core subsection 923 and mold path 982 for second aggregated core subsection 925.

The use of injection molded sublayers to form the aggregated core subsections 923, 925 and 927 can provide even further benefits and options for fine tuning characteristics of the golf ball core. For example, many of the various options discussed above can be incorporated into injection molding processes, such as different material types, thicknesses, orientations, etc. Further, injection molding the aggregate cups can simplify processing by forming the sublayers and shells at the same time. In addition, various characteristics unique to injection molding can be advantageously employed to provide even more adjustability and fine tuning of desired characteristics.

Figure 10:
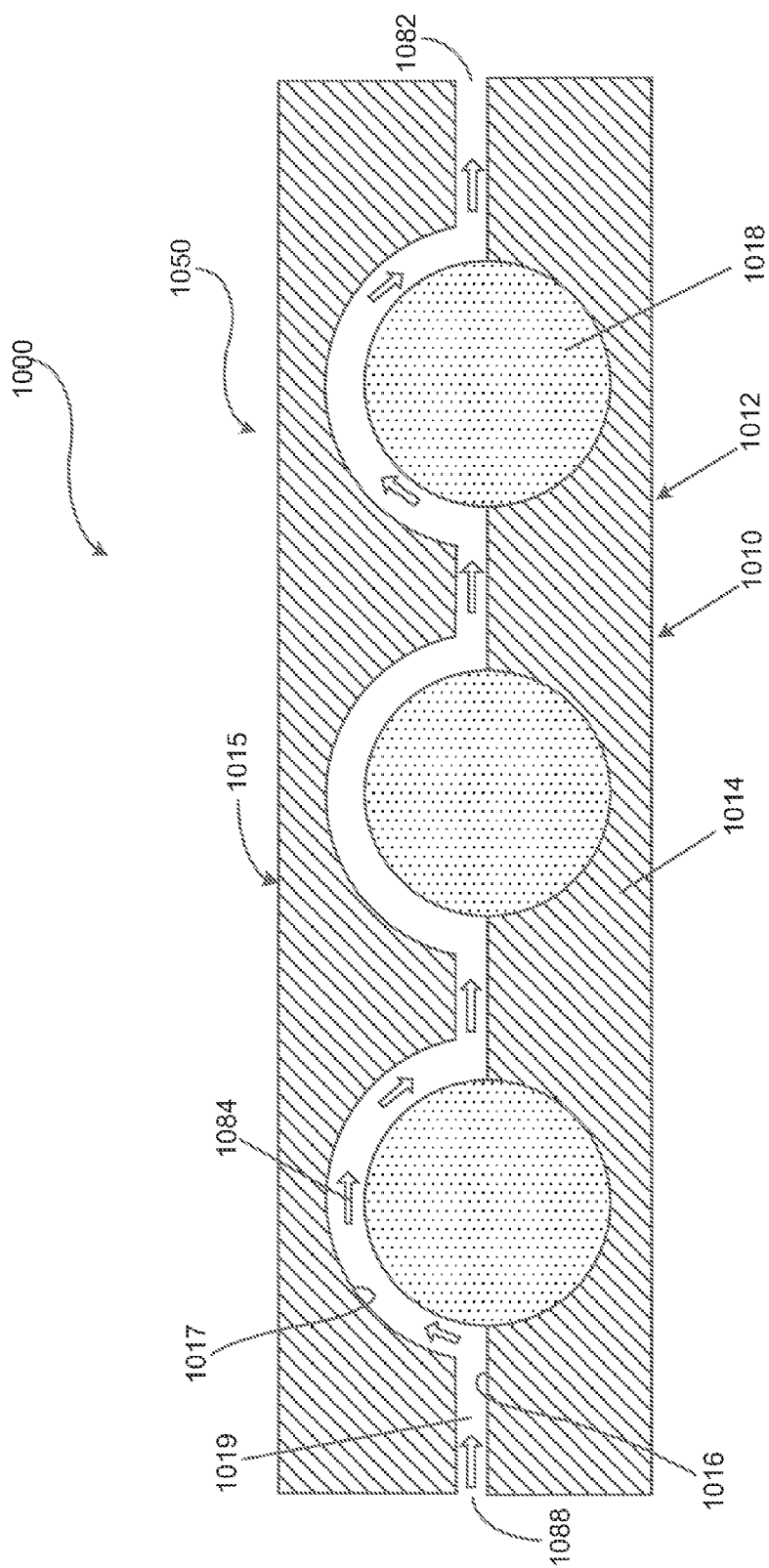
FIG. 10 illustrates an example process of forming an injection molded cup having a mold flow path.

In the configuration shown in FIG. 9, differing mold flow paths 980, 982 and 984 are used for different layers of aggregated intermediate core layer 920. The different mold flow paths can impart various characteristics to the golf ball core, such as affecting its performance during use and affecting its strength. Selectively modifying the flow paths for different layers can provide adjustability for these features. In addition, aggregating layers having different flow paths can provide an aggregated intermediate mold layer 920 having desired characteristics formed from the combined effects of the flow paths. FIG. 10 illustrates this further via an example mold system 1000 for forming aggregated injection molded cups having configured mold flow characteristics Referring now to FIG. 10, an aggregation cup mold 1000 is generally shown for forming an aggregation core sublayer cup (e.g., one of cups 929, 931 or 933 shown in FIG. 9) via injection molding. Aggregation cup mold 1000 generally includes a core 1010 and an opposing cavity 1015 that together form a mold 1050. Core 1010 generally includes a platform 1012 having a base 1014 and an opposite core surface 1016. Core surface 1016 has a plurality of core projections 1018 formed thereon extending away from platform 1012 toward cavity 1015. Core projections 1018 generally have either the shape and size of a portion of inner core 910 shown in FIG. 9 or the shape and size of an adjacent sublayer cup 931, 933 or 935 (FIG. 9) over which the molded cup will be placed in the stack of nested cups.

Core 1010 and opposing cavity 1015 are configured to form a mold space 1019 when in a closed position for injection molding an aggregation core sublayer cup 929, 931 or 933. Mold 1050 is configured to provide a mold flow path 1084 for the flow of elastomer through the mold during the molding process. Flow path 1084 can include multiple entrance and exit gates (not shown) to provide the desired flow path 1084, such as two or more entrance gates and two or more exit gates. Further, the entrance and exit gates (not shown) can be of various sizes and shapes in various combinations to accommodate various pressures, nozzles, flow velocities etc. as appropriate for providing the desired flow path 1084.

For simplicity, FIG. 10 shows elastomeric material entering mold space 1019 at entrance 1088, which could be an entrance gate, and flowing through the mold space according to mold flow 1084 toward exit 1082, which could be an exit gate. Once mold space 1019 has been appropriately injected with elastomeric material, mold 1050 retains the elastomeric material under appropriate conditions, such as temperature, pressure and timing conditions, to form one or more sublayer cups 929, 931 and 933. In one configuration of mold 1050, projections 1018 differ from each other and are appropriately sized and shaped such that mold 1050 forms all sublayer cups 929, 931 or 933 for a complete sublayer.

Figure 11:
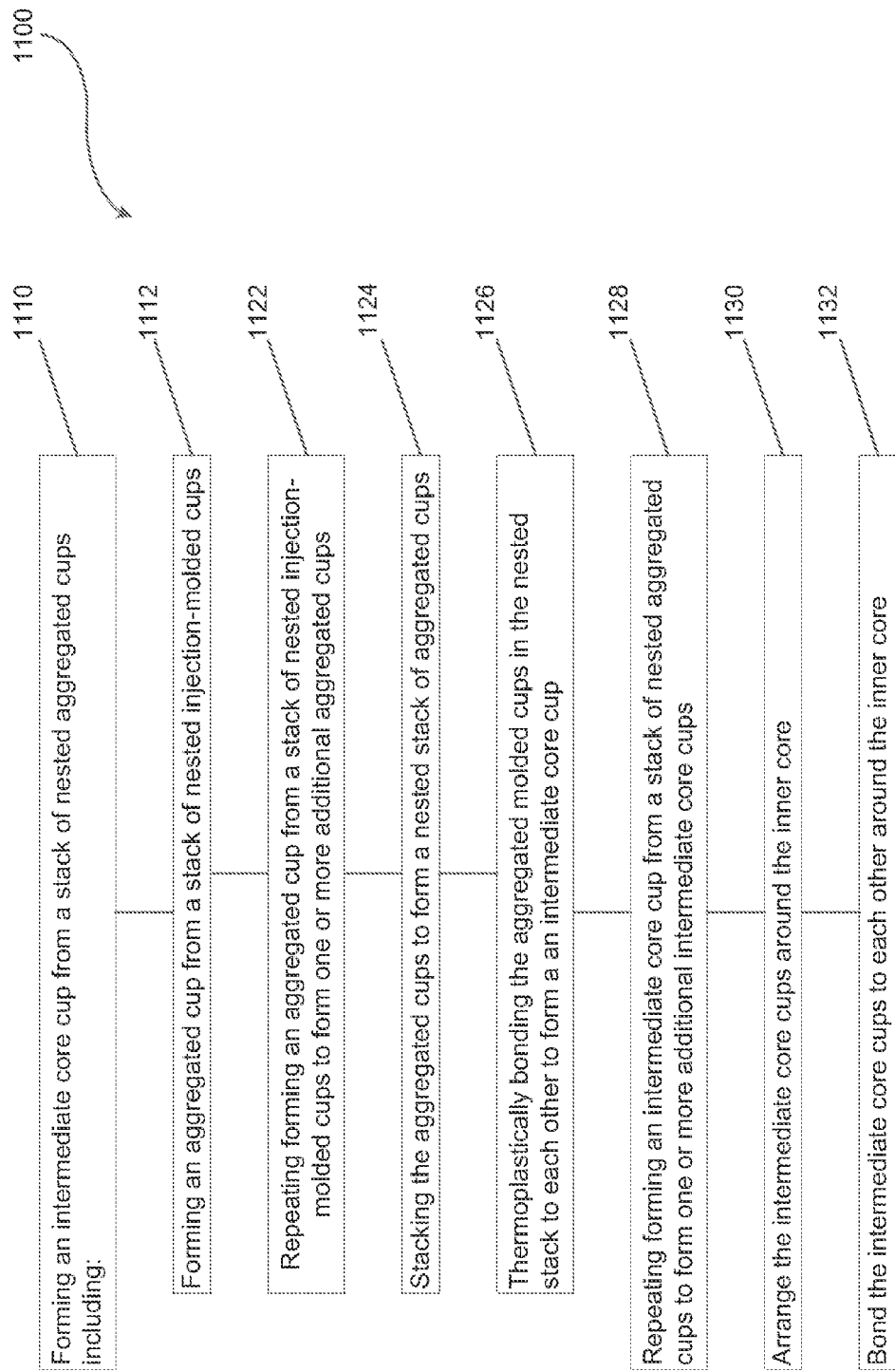
FIG. 11 illustrates an example process for forming a golf ball core having an aggregated core layer formed from a plurality of nested injection molded cups.
Figure 12:
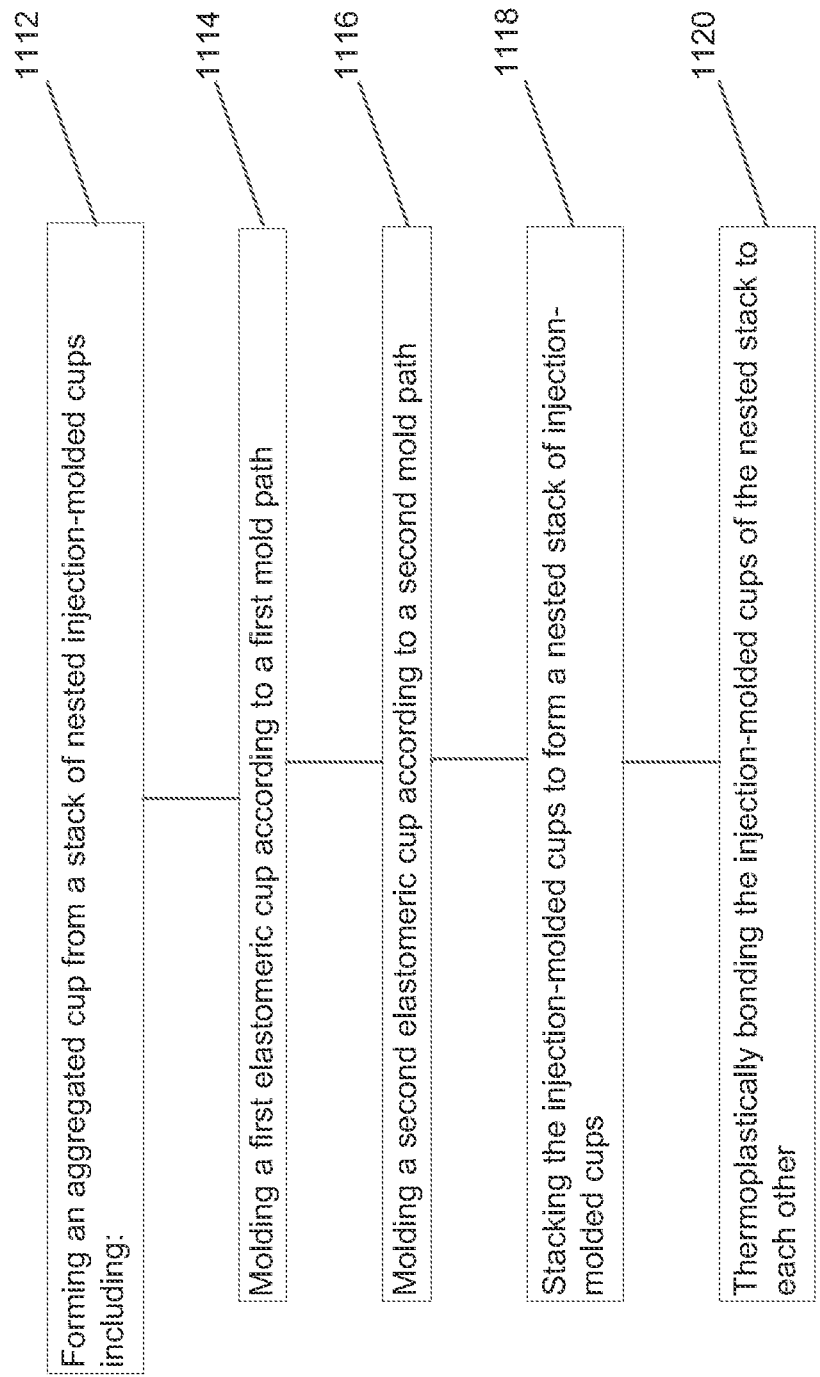
FIG. 12 illustrates an example process for forming an aggregated cup from a stack of nested injection-molded cups.

Referring now to FIGS. 11 and 12, an example method 1100 for forming a golf ball core having an aggregated core layer from a plurality of nested injection molded cups. Example method 1100 will be described using example golf ball 900 shown in FIG. 9 and aggregation cup mold 1000 shown in FIG. 10. As shown in FIG. 11, method 1100 includes step 1110 of forming an intermediate core cup from a stack of nested aggregated cups, which can include steps 1112, 1122, 1124 and 1126 noted hereafter.

Step 1112 includes forming an aggregated cup from a stack of nested injection-molded cups, which can include steps 1114 to 1120 shown in FIG. 12. Step 114 includes molding a first elastomeric cup according to a first mold path, step 1116 includes molding a second elastomeric cup according to a second mold path, either or both of which could be performed to mold cup 929, 931 and/or 933 of FIG. 9 via mold 1050 according to mold path 1084. Step 1118 includes stacking the injection-molded elastomeric cups to form a nested stack of injection-molded cups, which can include the cups 929, 931 and/or 933 of FIG. 9, and step 1120 includes thermoplastically bonding the injection-molded cups of step 1118 together to form an aggregated cup.

Returning to FIG. 11, step 1128 generally repeats step 1110 (i.e., steps 1112 through 1126) to form a second aggregated cup, such as a matching hemispherical that can mate with the first aggregated cup to form intermediate core section 920 of FIG. 9. Step 1130 includes arranging the intermediate core cups around the inner core and step 1132 includes subsequently bonding the formed intermediate core cups to each other around the inner core in a manner similar to step 824 of FIG. 8 and step 520 of FIG. 5 to form the golf ball core.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A golf ball comprising:
    an inner core;
    an outer shell enclosing the inner core; and
    an intermediate core disposed between the inner core and the outer shell and substantially enclosing the inner core, the intermediate core comprising a plurality of sublayers thermoplastically fused together to form an aggregated intermediate core layer,
    wherein a first set of the plurality of sublayers have a first thickness of less than 20 microns and a first characteristic and a second set of the plurality of sublayers have a second thickness of less than 20 microns and a second characteristic, wherein the first characteristic and the second characteristic differ from one another and are for a same member selected from the group consisting of material type, material properties, and additives.

2. The golf ball of claim 1, wherein the member is a material property selected from hardness, flexibility, impact resistance, yield strength, compressibility, and flexural modulus.

3. The golf ball of claim 1, wherein the plurality of sublayers includes ultrathin layers having a thickness less than 2.0 microns.

4. The golf ball of claim 3, wherein the plurality of sublayers includes ultrathin layers having a thickness less than 0.2 microns.

5. The golf ball of claim 1, wherein the plurality of sublayers includes a plurality of injection molded sublayers comprising directional additives molded in a plurality of different mold paths to impart different characteristics among the molded sublayers.

* * * * *